United States Patent
Saha et al.

(10) Patent No.: US 12,410,747 B1
(45) Date of Patent: Sep. 9, 2025

(54) SYSTEM AND METHOD FOR EXHAUST GAS RECIRCULATION AND INJECTION IN GAS TURBINE

(71) Applicant: GE Infrastructure Technology LLC, Greenville, SC (US)

(72) Inventors: Rajarshi Saha, Bangalore (IN); Jeevankumar Krishnan, Bangalore (IN); Sandeep Kumar Reddy Venkata, Bangalore (IN); Ravikumar Gunasekaran, Bangalore (IN)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/796,207

(22) Filed: Aug. 6, 2024

(51) Int. Cl.
*F02C 3/34* (2006.01)
*F02C 3/30* (2006.01)

(52) U.S. Cl.
CPC ............... *F02C 3/305* (2013.01); *F02C 3/34* (2013.01); *F05D 2270/08* (2013.01)

(58) Field of Classification Search
CPC .... F02C 3/305; F02C 3/34; F02C 7/12; F05D 2270/08
See application file for complete search history.

(56) References Cited

U.S. PATENT DOCUMENTS

| | | | | |
|---|---|---|---|---|
| 2,960,825 | A * | 11/1960 | Sampietro | F02C 7/36 475/72 |
| 5,794,431 | A * | 8/1998 | Utamura | F02C 7/10 60/39.182 |
| 6,499,303 | B1 | 12/2002 | Polukort et al. | |
| 8,479,489 | B2 | 7/2013 | Taylor et al. | |
| 9,388,737 | B2 | 7/2016 | Kraft | |
| 9,695,749 | B2 | 7/2017 | Kraft | |
| 10,815,874 | B2 | 10/2020 | Zia et al. | |
| 10,995,670 | B2 | 5/2021 | Kraft | |
| 2014/0208730 | A1 | 7/2014 | Kraft | |
| 2014/0374109 | A1 * | 12/2014 | Denton | F02C 7/18 166/309 |
| 2015/0000290 | A1 * | 1/2015 | Joshi | F01K 23/10 60/39.511 |
| 2016/0273395 | A1 | 9/2016 | Ekanayake et al. | |

* cited by examiner

*Primary Examiner* — Steven M Sutherland
(74) *Attorney, Agent, or Firm* — Fletcher Yoder, P.C.

(57) ABSTRACT

A system includes a gas turbine system having a gas turbine engine including a compressor, a combustor, and a turbine. The gas turbine system further includes an exhaust gas recirculation (EGR) system configured to recirculate a first portion of an exhaust flow from the gas turbine engine to an intake of the gas turbine engine. The gas turbine system further includes an exhaust gas injection system, including a multi-stage compressor including a plurality of stages, wherein the multi-stage compressor is configured to compress a second portion of the exhaust flow. The exhaust gas injection system further includes an intercooler coupled to the multi-stage compressor. The exhaust gas injection system is configured to inject the second portion of the exhaust flow into the gas turbine engine at one or more exhaust injection locations other than the intake to provide power augmentation of the gas turbine engine.

20 Claims, 3 Drawing Sheets

SYSTEM AND METHOD FOR EXHAUST GAS RECIRCULATION AND INJECTION IN GAS TURBINE

TECHNICAL FIELD

The present application relates generally to a system and method for recirculation and injection of exhaust gas in a gas turbine system.

BACKGROUND

An industrial plant, such as a combustion-driven power plant, may produce a variety of gases, such as an exhaust gas of a combustion system. The combustion system may include a gas turbine engine. These exhaust gases may include one or more undesirable gases, such as carbon containing gases. With various regulations and environmental concerns regarding global warming, it would be desirable to reduce the output of undesirable gases into the atmosphere. Unfortunately, exhaust gas treatment, such as gas capture (e.g., carbon capture), can reduce the efficiency and power output of the industrial plant. Therefore, a need exists to reduce the undesirable gases while offsetting the losses in efficiency and power output associated with the exhaust gas treatment.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

A system includes a gas turbine system having a gas turbine engine including a compressor, a combustor, and a turbine. The gas turbine system further includes an exhaust gas recirculation (EGR) system configured to recirculate a first portion of an exhaust flow from the gas turbine engine to an intake of the gas turbine engine. The gas turbine system further includes an exhaust gas injection system, including a multi-stage compressor including a plurality of stages, wherein the multi-stage compressor is configured to compress a second portion of the exhaust flow. The exhaust gas injection system further includes an intercooler coupled to the multi-stage compressor. The exhaust gas injection system is configured to inject the second portion of the exhaust flow into the gas turbine engine at one or more exhaust injection locations to provide power augmentation of the gas turbine engine, the one or more exhaust injection locations being axially spaced from the intake of the gas turbine engine.

A system includes a controller having a memory, a processor, and instructions stored on the memory and executable by the processor to control a first portion of an exhaust flow from a gas turbine engine through an exhaust gas recirculation (EGR) system to an intake of the gas turbine engine, wherein the gas turbine engine includes a compressor, a combustor, and a turbine. The controller is further configured to control a second portion of the exhaust flow from the gas turbine engine through an exhaust gas injection system to one or more exhaust injection locations to provide power augmentation of the gas turbine engine, the one or more exhaust injection locations being axially spaced from the intake of the gas turbine engine.

A method including controlling a first portion of an exhaust flow from a gas turbine engine through an exhaust gas recirculation (EGR) system to an intake of the gas turbine engine, wherein the gas turbine engine includes a compressor, a combustor, and a turbine. The method further includes controlling a second portion of the exhaust flow from the gas turbine engine through an exhaust gas injection system to one or more exhaust injection locations to provide power augmentation of the gas turbine engine, the one or more exhaust injection locations being axially spaced from the intake of the gas turbine engine.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein.

DETAILED DESCRIPTION

One or more specific embodiments of the presently disclosed systems and methods are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods to increase the power output and efficiency of a gas turbine system by injecting a portion of the exhaust gas of the EGR system of the gas turbine system into a compressor discharge casing of a gas turbine engine of the gas turbine system. Prior to injection into the compressor discharge casing, the portion of the exhaust gas is compressed via a compressor that is powered by a reciprocating engine. In certain embodiments, the compressor is a multi-stage compressor having a plurality of compression stages with intercoolers between the compression stages. Additionally, the reciprocating engine may provide waste heat to thermally adjust a temperature of the exhaust gas being injected into the compressor discharge casing. The injected exhaust gas may help to increase efficiency and power output of the gas turbine system. In systems having a gas capture system (e.g., a carbon capture system), the increased efficiency and power output achieved by the injected exhaust gas helps to offset efficiency losses and power losses associated with the gas capture system. Various aspects of the EGR system and exhaust injection are discussed in further detail below.

Figure 1:
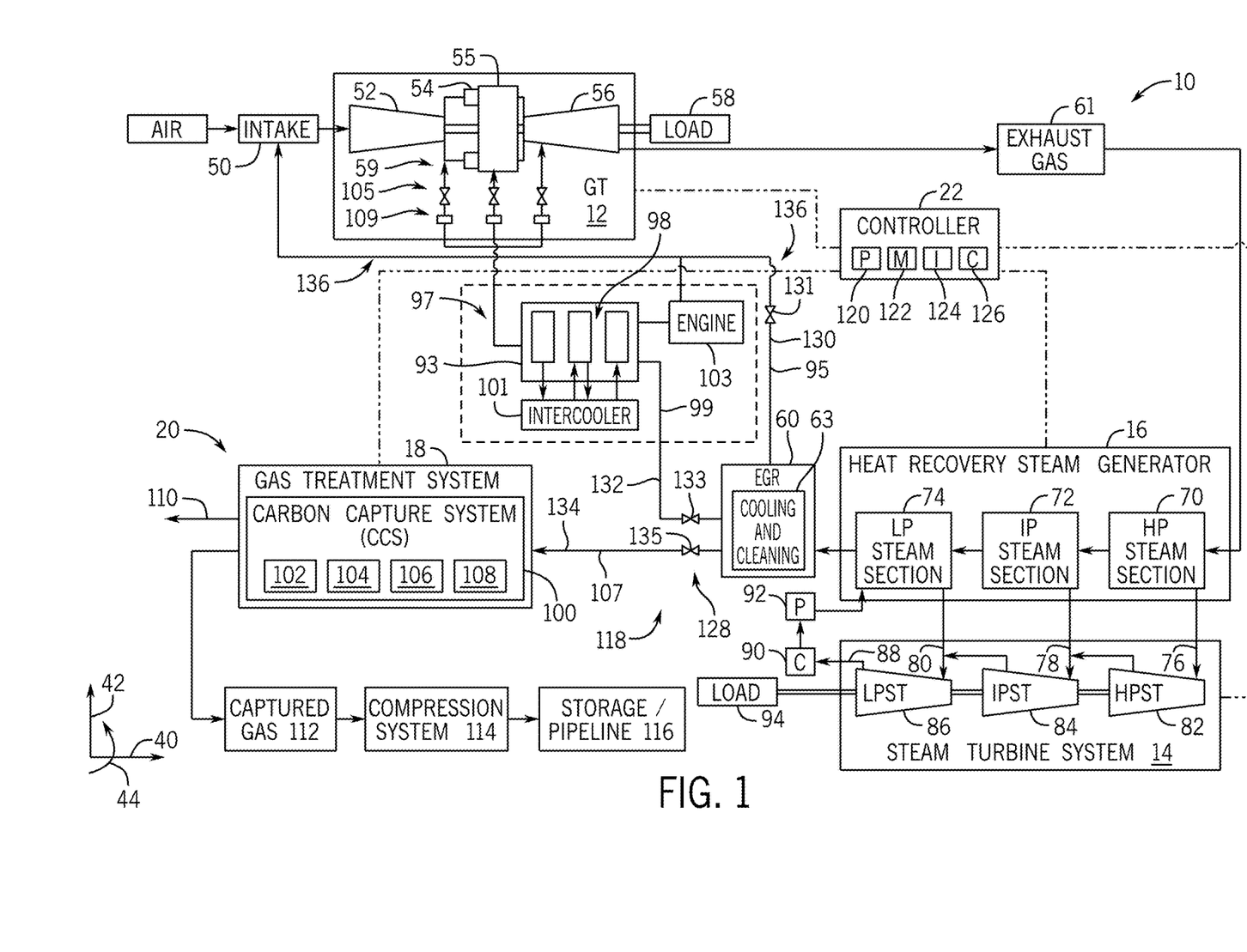
FIG. 1 is a block diagram of an embodiment of a system having a gas turbine system, one or more gas capture systems, and an exhaust gas recirculation (EGR) system.

FIG. 1 is a block diagram of an embodiment of a system 10 having a gas turbine system 12 (e.g., gas turbine engine), a steam turbine system 14, a heat recovery steam generator (HRSG) 16, a gas treatment system 18 having one or more gas capture systems 20, and a controller 22 coupled to each of the systems 12, 14, 16, and 18. As discussed below, the one or more gas capture systems 20 of the gas treatment system 18 are configured to capture an undesirable gas (e.g., $CO_2$) from exhaust gas and/or air (e.g., by direct or indirect air capture). In the illustrated embodiment, the system 10 is a combined cycle system having the gas turbine system 12, the steam turbine system 14, and the HRSG 16. However, in some embodiments, the system 10 may be a simple cycle system having the gas turbine system 12 without the steam turbine system 14 and the HRSG 16. In either case, the system 10 includes the gas treatment system 18 having the one or more gas capture systems 20 and an exhaust gas recirculation (EGR) system 60, wherein the EGR system 60 has exhaust injection at various exhaust injection locations 59. The exhaust injection helps to increase efficiency and power output of the gas turbine system 12, thereby helping to offset efficiency and power losses associated with the one or more gas capture systems 20.

Before discussing details of the gas treatment system 18, various aspects of the system 10 are discussed in further detail. For purposes of orientation in the drawings, reference may be made to an axial direction or axis 40, a radial direction or axis 42 extending radially away from the axial direction or axis 40, and a circumferential direction or axis 44 extending circumferentially around the axial direction or axis 40. The directions or axes 40, 42, and 44 may be in reference to a rotational axis of the gas turbine system 12, for example.

The gas turbine system 12 includes an air intake 50, a compressor 52 having one or more compressor stages, one or more combustors 54, a compressor discharge casing 55, a turbine 56 (e.g., an expansion turbine) having one or more turbine stages, and a load 58 (e.g., electrical generator) driven by the turbine 56. As discussed above, the gas turbine system 12 includes the EGR system 60 configured to recirculate an exhaust gas 61 into the air intake 50. In certain embodiments, the EGR system 60 includes one or more cooling and cleaning module(s) 63 configured to receive exhaust gas 61 from the gas turbine system 12 and/or the HRSG 16. The cooling and cleaning modules 60 may include one or more condensers and/or one or more filters configured to cool and clean the exhaust gas 61 received from the gas turbine system 12 and/or the HRSG 16. The recirculated exhaust gas 61 helps to reduce the temperature of exhaust gas 61 and the formation of certain emissions (e.g., nitrogen oxides ($NO_X$)) associated with combustion in the combustors 54. In operation, the compressor 52 receives air (and also exhaust gas 61 if the EGR system 60 is active) from the air intake 50 and compresses the air and/or exhaust gas 61 in one or more compressor stages (e.g., stages of rotating compressor blades). The compressed air travels from the last compressor stage, through a compressor diffuser, and into a compressor discharge casing 55, which surrounds at least the downstream portions of the combustors 54. The combustors 54 include one or more fuel nozzles (or burners) that generate hot combustion gases by combusting fuel from a fuel supply system with the compressed air and/or exhaust gas (i.e., fluids from the compressor discharge casing 55, which may have been used previously to cool the combustors 54). The hot combustion gases expand and drive one or more turbine stages (e.g., stages of rotating turbine blades) in the turbine 56, thereby driving rotation of the compressor 52 and the load 58 via shafts. The turbine 56 then outputs the energy-depleted combustion gases as the exhaust gas 61.

In a combined cycle configuration of the system 10, the HRSG 16 recovers waste heat from the exhaust gas 61 to generate steam for driving the steam turbine system 14. The HRSG 16 includes a high-pressure (HP) steam section 70, an intermediate-steam (IP) section 72, and a low-pressure (LP) steam section 74 configured to generate HP steam 76, IP steam 78, and LP steam 80. The steam turbine system 14 may include an HP steam turbine 82 driven by the HP steam 76, an IP steam turbine 84 driven by the IP steam 78, and a LP steam turbine 86 driven by the LP steam 80. In addition to the steam provided by the HRSG 16, the HP steam turbine 82 provides IP steam to the IP steam turbine 84, and the IP steam turbine 84 provides LP steam to the LP steam turbine 86. The LP steam turbine 86 then outputs any remaining steam/water to a condensate line 88 coupled to the LP steam section 74 of the HRSG 16. The condensate line 88 may include a condenser 90 configured to condense any remaining steam to form a condensate, and a pump 92 configured to pump the condensate back to the LP steam section 74. In operation, the steam turbine system 14 drives a load 94 (e.g., electrical generator) via a shaft.

In certain embodiments, the steam turbine system 14 and/or the HRSG 16 may provide heated water and/or steam (e.g., HP steam 76, IP steam 78, and/or LP steam 80) to the gas treatment system 18 to support a desorption mode of the one or more gas capture systems 20. For example, the gas capture systems 20 may receive heated water and/or steam in a temperature range of 100 to 150 degrees Celsius, 110 to 150 degrees Celsius, 120 to 150 degrees Celsius, or 130 to 150 degrees Celsius. In a simple cycle configuration of the system 10, the steam turbine system 14 and the HRSG 16 are excluded from the system 10.

The exhaust gas 61 flows from the gas turbine system 12 and/or the HRSG 16 to the EGR system 60 having the cooling and cleaning module(s) 63. In the illustrated embodiment, the EGR system 60 is configured to control flows of the exhaust gas 61 via an exhaust gas circuit 118 (e.g., fluid conduits and manifolds) having valves 128, wherein the exhaust gas circuit 118 includes an exhaust gas circuit 130 extending to the intake 50, an exhaust gas circuit 132 extending through an exhaust gas injection system 97 to one or more exhaust injection locations 59 downstream of the compressor 52 (e.g., compressor discharge casing 55, combustors 54, and/or turbine 56), and an exhaust gas circuit 134 extending to the gas treatment system 18. The exhaust gas circuit 130 includes a valve 128, 131 configured to selectively control an amount or percentage of the exhaust gas 61 (e.g., intake portion 95) directed to the intake 50. The exhaust gas circuit 132 includes a valve 128, 133 configured to selectively control an amount or percentage of the exhaust gas 61 (e.g., injection portion 99) directed to the one or more exhaust injection locations 59 through the exhaust gas injection system 97. The exhaust gas circuit 134 includes a valve 128, 135 configured to selectively control an amount or percentage of the exhaust gas 61 (e.g., gas capture portion 107) directed to the gas treatment system 18. As shown, the exhaust gas circuit 130 routes the intake portion 95 of the exhaust gas 61 to the intake 50 of the gas turbine system 12. In certain embodiments, a fan or blower may help to force a flow of the intake portion 95 of the exhaust gas 61 to the intake 50.

In the illustrated embodiment, the exhaust gas circuit 132 routes the injection portion 99 (e.g., partial extraction) of the exhaust gas 61 to the exhaust gas injection system 97. As shown, the exhaust gas injection system 97 includes an exhaust gas compressor, such as a multi-stage compressor 93 having a plurality of stages 98. The plurality of stages 98 is configured to compress the injection portion 99 of the exhaust gas 61 in compression stages. The multi-stage compressor 93 is configured to receive the injection portion 99 of the exhaust gas 61 from the EGR system 60. The exhaust gas injection system 97 also includes an intercooler 101 fluidly coupled to each stage of the plurality of stages 98 of the multi-stage compressor 93. The intercooler 101 is configured to cool the injection portion 99 of the exhaust gas 61 between the stages 98 of compression by the multi-stage compressor 93. As shown, the exhaust gas injection system 97 also includes an engine 103 (e.g., reciprocating piston-cylinder engine) configured to drive the multi-stage compressor 93. The engine 103 may include 1, 2, 3, 4, 5, 6, 7, 8, 9, or 10 piston-cylinder assemblies driven by combustion of a fuel, such as natural gas, diesel, gasoline, or biofuel.

Additionally, the exhaust gas injection system 97 includes one or more valves 105 configured to adjust a proportion (e.g., amount) of the injection portion 99 of the exhaust gas 61 through the exhaust gas circuit 132 to the various exhaust injection locations 59 (e.g., compressor discharge casing 55, combustors 54, and turbine 56 of the gas turbine system 12). Each of the exhaust injection locations 59 is generally downstream of compression (e.g., compression stages of compressor blades) of the compressor 52. In operation, the injection portion 99 of the exhaust gas 61 is configured to increase or augment power of the gas turbine system 12, such as by providing additional fluid energy (i.e., additional mass flow) to drive the turbine 56. Exhaust gas 61 provided to the compressor discharge casing 55 may be used to cool the combustors 54 and may be subsequently directed to the fuel nozzles for participation in the combustion of fuel to generate additional combustion gases. Alternately, or additionally, exhaust gas 61 provided to the combustors 54 may be supplied directly to the fuel nozzles for introduction into the combustors 54 (e.g., used as a diluent or as a barrier fluid between fuel and air streams).

In certain embodiments, the exhaust gas injection system 97 includes heat exchangers 109 to selectively transfer heat with (e.g., heat or cool) the injection portion 99 of the exhaust gas 61 through the exhaust gas circuit 132 to the various exhaust injection locations 59, such that the temperature of the injection portion 99 can be controlled to generally match temperatures at the exhaust injection locations 59. For example, the heat exchangers 109 may be configured to transfer heat between the engine 103 and the injection portion 99, such as by circulating a heat transfer medium (e.g., lubricant, coolant, water, etc.) between the engine 103 and the heat exchangers 109.

In the illustrated embodiment, the exhaust gas circuit 134 and the valve 135 selectively route the gas capture portion 107 of the exhaust gas 61 through one or more gas capture systems 20 configured to capture undesirable gases. The undesirable gases may include carbon oxides ($CO_X$) (e.g., carbon dioxide ($CO_2$) and carbon monoxide (CO)), nitrogen oxides ($NO_X$) (e.g., nitrogen dioxide ($NO_2$)), sulfur oxides ($SO_X$) (e.g., sulfur dioxide ($SO_2$)), or any combination thereof. In the following discussion, $CO_2$ may be used as an example of the undesirable gases; however, the gas capture systems 20 may be designed to capture any of the foregoing undesirable gases. For example, the gas capture systems 20 include one or more carbon capture systems 100 (e.g., $CO_2$ capture systems). The gas capture systems 20 (e.g., carbon capture systems 100) may include sorbent-based gas capture systems, solvent-based gas capture systems, cryogenic gas capture systems, or any combination thereof, configured to remove and capture undesirable gases. The carbon capture system 100 may include components 102, 104, 106, and 108 configured to enable gas capture of undesirable gases (e.g., $CO_2$) from the exhaust gas 61, thereby outputting a treated gas 110 and a captured gas 112 (e.g., $CO_2$). The treated gas 110 may be substantially free of the undesirable gases (e.g., $CO_2$) and may be discharged through an exhaust stack. The captured gas 112 (e.g., $CO_2$) may be compressed by a compression system 114 and stored and/or transported by a storage and/or pipeline system 116.

In certain embodiments, the carbon capture system 100 is a sorbent-based carbon capture system, and the components 102, 104, 106, and/or 108 include multiple sorbent-based carbon capture units (e.g., adsorbers). For example, the sorbent-based carbon capture units may include temperature swing adsorption (TSA) units or adsorbers, wherein a temperature swing or change is used to sequentially operate in an adsorption mode, a desorption mode, and a cooling mode at different temperatures. In the adsorption mode, the adsorber is configured to adsorb undesirable gases (e.g., $CO_2$) into sorbent material at a first temperature. In the desorption mode, the adsorber is configured to desorb the undesirable gases (e.g., $CO_2$) from the sorbent material, for example, by heating the sorbent material from the first temperature to a higher second temperature using a heat source. The heat source may include a heated fluid, such as a heated gas and/or liquid (e.g., steam). In the cooling mode, the adsorber is cooled in preparation for the next adsorption mode.

In certain embodiments, the carbon capture system 100 is a solvent-based carbon capture system, and the components 102, 104, 106, and/or 108 include one or more absorbers, strippers, and associated equipment. For example, the absorber is configured to absorb undesirable gases (e.g., $CO_2$) into a solvent, thereby outputting the treated gas 110 through an exhaust stack and a $CO_2$-rich solvent to the stripper. The stripper is configured to apply heat to the $CO_2$-rich solvent, thereby stripping the undesirable gases (e.g., $CO_2$) from the solvent to produce the captured gas 112 and a $CO_2$-lean solvent. The stripper may receive heat via a heat source, such as a heated gas and/or liquid (e.g., steam). The stripper returns the $CO_2$-lean solvent to the absorber to repeat the cycle.

In the illustrated embodiment, the controller 22 is configured to control all aspects of the system 10. The controller 22 includes one or more processors 120, memory 122, instructions 124 stored on the memory 122 and executable by the processor 120, and communication circuitry 126 configured to communicate with sensors and various equipment of the system 10. For example, the controller 22 is configured to receive sensor feedback from sensors coupled to the gas turbine system 12, the steam turbine system 14, the HRSG 16, and the gas treatment system 18 (e.g., gas capture systems 20), and control the same equipment based on the sensor feedback, operating modes, user input, computer models, or any combination thereof. The sensors (e.g., sensors 180, 182 in FIG. 2) may include temperature sensors, pressure sensors, flow rate sensors, gas composition sensors, or any combination thereof. In certain embodiments, the controller 22 is configured to control operation of the gas capture systems 20 (e.g., carbon capture systems 100), such by controlling modes of operation (e.g., adsorption mode, desorption mode, and cooling mode), controlling heat sources for supplying heated fluid (e.g., steam) to the gas capture systems 20, controlling cooling sources for supply cooled fluids to the gas capture systems 20, or any combination thereof.

In certain embodiments, the controller 22 may be configured to control flows through each of the exhaust gas circuits 118 (e.g., 130, 132, and 134), such as by controlling the valves 128 (e.g., 131, 133, and 135) and the valves 105, thereby selectively varying (e.g., increasing or decreasing) exhaust flows to the intake 50, the exhaust injection locations 59 (e.g., the compressor discharge casing 55, the combustors 54, and the turbine 56), and the gas treatment system 18. Collectively, the valves 128 (e.g., 131, 133, and 135) and the valves 105 may be identified as valves 136, wherein the valves 136 may include passive valves (e.g., check valves responsive to pressure differentials), active valves (e.g., actuator-controlled valves responsive to control by the controller 22), or any combination thereof. Additionally, the controller 22 may be configured to control one or more components of the exhaust gas injection system 97, such as the multi-stage compressor 93, the intercooler 101, the engine 103, valves 105, and the heat exchangers 109.

In certain embodiments, the controller 22 is configured to control the EGR system 60, the exhaust gas injection system 97, the gas turbine system 12, and the gas treatment system 18 (e.g., the carbon capture system 100) in cooperation with one another based on sensor feedback indicative of an operating condition and/or a load on the gas turbine system 12, power demand by the gas treatment system 18 (e.g., the carbon capture system 100), sensed exhaust emissions versus threshold values, or any combination thereof. For example, the load on the gas turbine system 12 may include a part load condition or a full load condition, wherein the load may include the load to drive an electrical generator or other equipment, power demand on a power grid, power demand by the gas treatment system 18 (e.g., the carbon capture system 100), or any combination thereof. The operating condition of the gas turbine system 12 may include a transient condition (e.g., a startup condition, a shutdown condition, or a variable demand condition), a steady state condition, or any combination thereof. By further example, the power demand by the gas treatment system 18 (e.g., the carbon capture system 100) may vary depending on a concentration of undesirable gases (e.g., $CO_2$) in the exhaust gas, a flow rate of the exhaust gases, a fuel composition used in the gas turbine system 12 (e.g., dirty versus clean fuel), a target level (e.g., percentage) of carbon capture, a number of stages of carbon capture, or any combination thereof. Similarly, the sensed emissions may include sensed emissions levels of the undesirable gases, such as $CO_X$ (CO and/or $CO_2$), $NO_X$, $SO_X$, or any combination thereof, wherein the sensed emissions are compared against threshold values based on regulatory requirements, gas turbine controls, and controls by the gas treatment system 18.

In operation, the controller 22 may vary the flows of exhaust gas 61 through the intake 50 for emissions control (e.g., $NO_X$ control), through the exhaust gas injection system 97 to the one or more exhaust injection locations 59 for power augmentation, and through the exhaust gas treatment system 18 (e.g., carbon capture system 100) for emissions control and carbon capture, such that targets are met for each of the systems. In certain embodiments, the controller 22 is configured to increase the flow of exhaust gas 61 through the exhaust gas injection system 97 to the one or more exhaust injection locations 59 to increase power augmentation to offset increases in power demand by the exhaust gas treatment system 18 (e.g., carbon capture system 100), and the controller 22 is configured to decrease the flow of exhaust gas 61 through the exhaust gas injection system 97 to the one or more exhaust injection locations 59 to decrease power augmentation to in response to decreases in power demand by the exhaust gas treatment system 18 (e.g., carbon capture system 100). Additionally, the controller 22 may be configured to increase or decrease the flow of exhaust gas 61 through the exhaust gas treatment system 18 (e.g., carbon capture system 100) to increase or decrease the amount of carbon capture. Thus, the controller 22 is configured to cooperatively control the exhaust emissions levels, amounts of carbon capture, and power output to the electrical grid.

Figure 2:
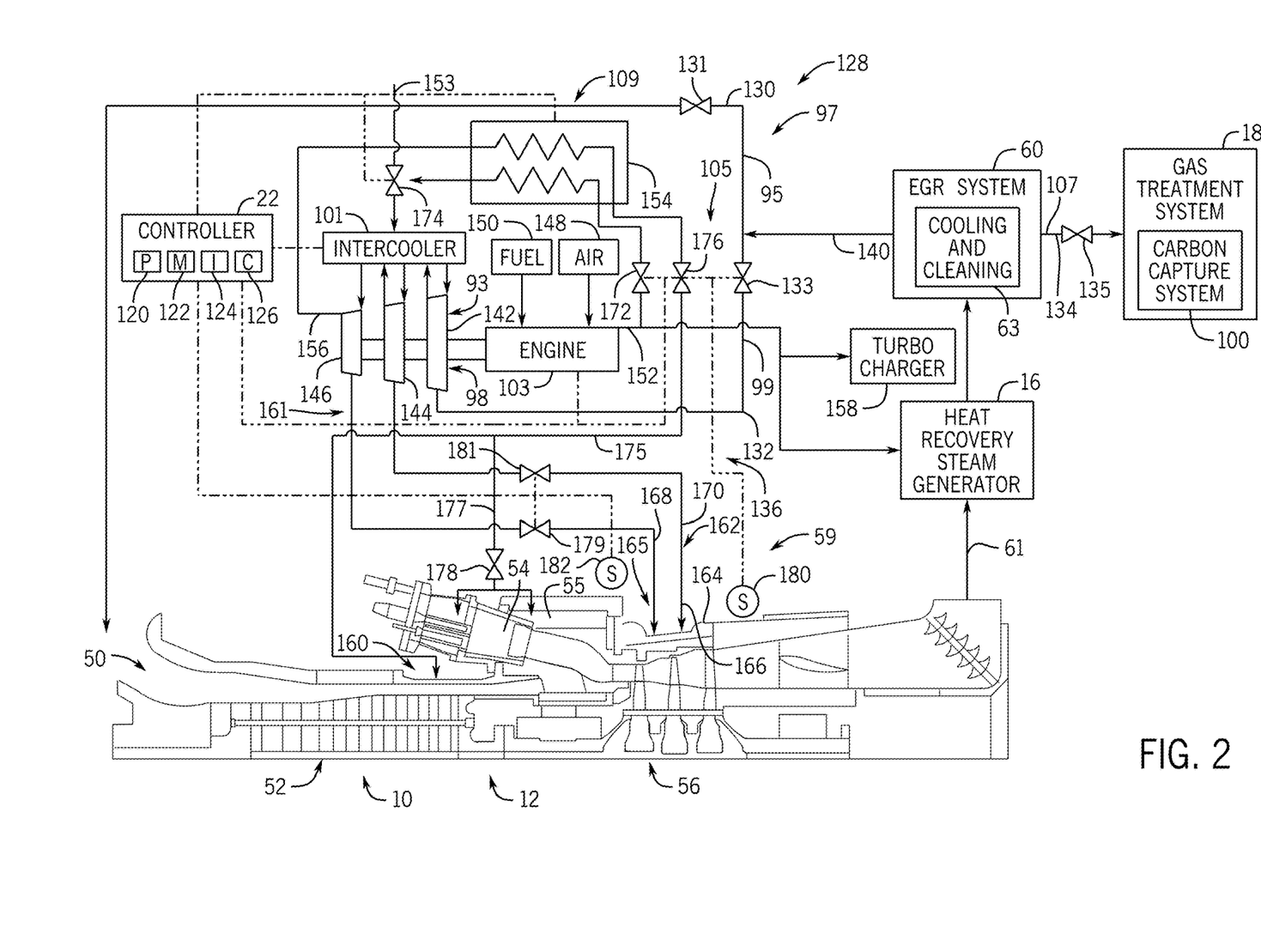
FIG. 2 is a schematic of an embodiment of the system of FIG. 1, further illustrating an exhaust gas injection system configured to inject exhaust gas from the EGR system into one or more locations of the gas turbine system.

FIG. 2 is a schematic of an embodiment of the system 10, further illustrating features of the exhaust gas injection system 97 of the EGR system 60. In the illustrated embodiment, the EGR system 60 recirculates at least a portion of the exhaust gas 61 produced by the gas turbine system 12, wherein the EGR system 60 may receive the exhaust gas 61 directly from the gas turbine system 12 and/or indirectly via the HRSG 16. The EGR system 60 cools and cleans the exhaust gas 61 via the cooling and cleaning module(s) 63. The EGR system 60, such as by controlling the valves 131, 133, and 135 via the controller 22, selectively routes the exhaust gas 61 through the exhaust gas circuits 118 (e.g., 130, 132, and 134) to the intake 50, the exhaust gas injection system 97, or the gas treatment system 18 having the carbon capture system 100. In certain embodiments, a majority of the exhaust gas 61 is diverted to the gas treatment system 18. For example, more than 60, 65, 70, 75, 80, or 85 percent of the exhaust gas 61 (e.g., gas capture portion 107) may be diverted to the gas treatment system 18 along the exhaust gas circuit 134.

As shown, a remaining portion 140 of the exhaust gas 61 is diverted either to the intake 50 of the gas turbine system 12 (e.g., intake portion 95) via the exhaust gas circuit 130 or to the exhaust gas injection system 97 (e.g., injection portion 99) via the exhaust gas circuit 132. In certain embodiments, the injection portion 99 of the remaining portion 140 of the exhaust gas 61 may comprise less than 15, 12, 9, 6, or 3 percent of the remaining portion 140 of the exhaust gas 61. That is, the majority of the remaining portion 140 is fed back to the intake 50 of the gas turbine system 12. However, any suitable percentage or ratio of the exhaust gas 61 may be routed through the exhaust gas circuits 118 (e.g., 130, 132, and 134) to the intake 50, the exhaust gas injection system 97, or the gas treatment system 18. Additionally, any suitable percentage or ratio of the exhaust gas 61 may be routed through the exhaust gas circuit 118, 132 having the exhaust gas injection system 97 to one or more of the exhaust injection locations 59 downstream of the compressor 52 (e.g., compressor discharge casing 55, combustors 54, and/ or turbine 56). The foregoing percentages or ratios of the exhaust gas may be achieved with the valves 128 (e.g., 131, 133, and 135) and the valves 105.

As shown, the exhaust gas injection system 97 includes the multi-stage compressor 93 having the plurality of stages 98 (e.g., stages 142, 144, and 146). Although the illustrated embodiment shows the multi-stage compressor 93 having three stages 98, it should be recognized that the multi-stage compressor 93 may include two or more stages 98. For example, the multi-stage compressor 93 may include 2, 4, 5, 6, 7, 8, or more stages 98. The multi-stage compressor 93 is driven by the engine 103 (e.g., reciprocating piston-cylinder engine) that receives air 148 and fuel 150 (e.g., natural gas, diesel fuel, biofuel, gasoline, etc.) and produces an engine exhaust gas 152. It may be recognized that the multi-stage compressor 93 is configured to compress the exhaust gas 61 to produce a compressed exhaust gas 156 having a pressure that substantially matches the pressure of the exhaust injection location 59, such as the compressor discharge casing 55 of the gas turbine system 12.

The exhaust gas injection system 97 also includes the intercooler 101. In the illustrated embodiment, the intercooler 101 is fluidly coupled to the plurality of stages 98 of the multi-stage compressor 93. As shown, the intercooler 101 is bidirectionally fluidly coupled to the stages 142 and 144 and unidirectionally fluidly coupled to the stage 146, such that the exhaust gas 61 flows from the intercooler 101 to the stage 146. In certain embodiments, both the first stage (e.g., stage 142) and the last stage (e.g., stage 146) of the multi-stage compressor 93 may be unidirectionally fluidly coupled to the intercooler 101. In certain embodiments, the intercooler 101 may be fluidly coupled to any combination of the stages 98 of the multi-stage compressor 93. As shown, the intercooler 101 may receive a coolant 153 (e.g., water) from an external coolant source.

In the illustrated embodiment, the exhaust gas injection system 97 also includes at least one heat exchanger 109, such as a heat exchanger 154 (e.g., waste heat recovery system, heat exchanger, or recuperator). The heat exchanger 154 is fluidly coupled to the multi-stage compressor 93 as well as the engine 103 and is configured to receive compressed exhaust gas 156 output by the multi-stage compressor 93 and engine exhaust gas 152 output by the engine 103. The heat exchanger 154 is configured to transfer heat from the engine exhaust gas 152 to the compressed exhaust gas 156. After passing through the heat exchanger 154, the compressed exhaust gas 156 may be injected into the compressor discharge casing 55 of the gas turbine system 12. In certain embodiments, the heat exchanger 154 may be configured to heat the compressed exhaust gas 156 until a temperature of the compressed exhaust gas 156 substantially matches (e.g., within plus or minus 5, 10, 15, 20, or 25 degrees Celsius of) a temperature of the high-pressure air in the compressor discharge casing 55. In certain embodiments, after the engine exhaust gas 152 passes through the heat exchanger 154, the engine exhaust gas 152 may be vented into the atmosphere.

In certain embodiments, the exhaust gas injection system 97 includes a turbocharger 158. In certain embodiments, the engine 103 is fluidly coupled to the turbocharger 158, such that the engine exhaust gas 152 is directed from the engine 103 to the turbocharger 158, thereby at least partially powering the turbocharger 158. The turbocharger 158 may include a turbine that is driven by the engine exhaust gas 152. The turbocharger 158 may also include a compressor driven by the turbine that compresses the air 148 received by the engine 103. In the illustrated embodiment, the engine 103 if fluidly coupled to the HRSG 16, such that the engine exhaust gas 152 is received by the HRSG 16 from the engine 103. In certain embodiments, the engine 103 may be fluidly coupled to the compressor discharge casing 55, such that the engine exhaust gas 152 is injected into the compressor discharge casing 55. In certain embodiments, the engine exhaust gas 152 may be directed to the HRSG 16, the compressor discharge casing 55, the turbocharger 158, or a combination thereof.

In the illustrated embodiment, the exhaust gas injection system 97 is configured to inject the compressed exhaust gas 156 (e.g., the injection portion 99) from the EGR system 60 into one or more exhaust injection locations 59 of the gas turbine system 12. As shown, the heat exchanger 154 may be fluidly coupled to the compressor discharge casing 55 and/or a last stage portion 160 of the compressor 52 of the gas turbine system 12 (e.g., downstream from compression by compressor blades of the compressor 52). In certain embodiments, the compressed exhaust gas 156 may be directed from the heat exchanger 154 to the last stage portion 160 of the compressor 52, the compressor discharge casing 55, or a combination.

Additionally, or alternatively, the exhaust gas injection system 97 may be configured to inject a turbine portion 161 of the exhaust gas 61 into the turbine 56 (e.g., expansion turbine) of the gas turbine system. The exhaust gas injection system 97 may be fluidly coupled to one or more exhaust injection locations 59 (e.g., turbine locations 162) through an exterior casing 164 of the turbine 56 into an exhaust flow path through the turbine 56. As shown, the last stage 146 of the multi-stage compressor 93 is fluidly coupled to a first axial location 165 of the one or more turbine locations 162, and the intermediate stage 144 of the multi-stage compressor 93 is fluidly coupled to a second axial location 166 of the one or more turbine locations 162. The first axial location 165 and the second axial location 166 are different from one another. That is, the first axial location 165 and the second axial location 166 have different positions along the axial direction 40. As illustrated, the first axial location 165 is upstream (i.e., forward) of the second axial location 166. The turbine portion 161 of the exhaust gas 61 may include an upstream portion 168 that is injected from the stage 146 of the multi-stage compressor 93 into the first axial location 165 of the turbine 56. Additionally, the turbine portion 161 of the exhaust gas 61 may include a downstream portion 170 that is injected from the stage 144 of the multi-stage compressor 93 into the second axial location 166 of the turbine 56. It may be appreciated that the stages 98 of the multi-stage compressor 93 compress the exhaust gas 61 in discrete stages (e.g., steps), thereby enabling a substantial matching of the pressure of the exhaust gas 61 at each stage 68 with a pressure of air flowing through the gas turbine system 12.

Although the illustrated embodiment shows two stages 98 of the multi-stage compressor 93 being fluidly coupled to two turbine locations 162 of the turbine 56 of the gas turbine system 12, it should be recognized that fewer or more stages 98 of the multi-stage compressor 93 may be fluidly coupled to the turbine 56. For example, one stage of the multi-stage compressor 93 may be fluidly coupled to the turbine 56. In another example, extractions from one or more stages of a multi-stage compressor 93 having 3, 4, 5, 6, 7, 8, or more stages 98 may be fluidly coupled to one or more stages of the turbine 56. Additionally, or alternatively, the coupling of the stages 98 of the multi-stage compressor 93 with the turbine 56 may be in combination with the coupling of the heat exchanger 154 with the compressor 52 and/or the compressor discharge casing 55.

In the illustrated embodiment, the EGR system 60 and/or the exhaust gas injection system 97 includes the one or more valves 136, which include the valves 128 (e.g., 131, 133, and 135) and the valves 105 (e.g., valves 172, 174, 176, 178, 179, and 181). The controller 22 may be communicatively coupled to any combination of the one or more valves 136. As shown, the valve 172 is disposed between the heat exchanger 154 and the engine 103. The valve 172 may be configured to adjust a flow rate of the engine exhaust gas 152 from the engine 103 to the heat exchanger 154, thereby adjusting an amount of heat transfer from the engine exhaust gas 152 to the compressed exhaust gas 156 in the heat exchanger 154.

As shown, the one or more valves 105 also include the valve 174 disposed between the heat exchanger 154 and the intercooler 101, such that the heat exchanger 154 is fluidly coupled to the intercooler 101. Additionally, the valve 174 is fluidly coupled with the engine 103 and may be configured to adjust a flow rate of the engine exhaust gas 152 expelled by the heat exchanger 154 that flows into the intercooler 101. In certain embodiments, the valve 174 may be configured to receive a signal from the controller 22 to adjust a proportion of the engine exhaust gas 152 that enters the intercooler 101 versus being vented to the air (venting not shown in FIG. 2).

Additionally, an exhaust gas circuit 175 extends between the heat exchanger 154 and the gas turbine 12. Specifically, the one or more valves 105 described above may include the valve 176 disposed along exhaust gas circuit 175 between the heat exchanger 154 and the last stage of the compressor 52 (i.e., feeding the compressor discharge casing 55), and the valve 178 disposed between the heat exchanger 154 and the combustors 54 (e.g., directing compressed exhaust gas 156 to the fuel nozzles) along exhaust gas circuit 177, which may be fluidly coupled to exhaust gas circuit 175. In certain embodiments, the valve 176 may be configured to receive a signal from the controller 22 to adjust a flow rate of the compressed exhaust gas 156 being injected into the compressor discharge casing 55 from the heat exchanger 154. Similarly, the valve 178 may be configured to receive a signal from the controller 22 to adjust a flow rate of the compressed exhaust gas 156 being injected into the combustors 54 from the heat exchanger 154. For example, in certain embodiments, the controller 22 may instruct the valves 176 and/or 178 to decrease the flow rate of the compressed exhaust gas 156 to the compressor discharge casing 55 and/or the combustors 54 when the turbine 56 is operating at part load.

Additionally, the valve 133 is disposed between the EGR system 60 and the multi-stage compressor 93. The valve 133 may be configured to receive a signal from the controller 22 to control the proportion (e.g., the injection portion 99) of the remaining portion 140 of the exhaust gas 61 that is diverted to the exhaust gas injection system 97. For example, the controller 22 may be configured to instruct the valve 133 to decrease the proportion of the injection portion 99 in response to detecting that the turbine 56 is operating in part load or has ceased operation. In certain embodiments, the controller 22 may instruct the valve 133 to stop the extraction of the injection portion 99 from the exhaust gas 61 expelled from the EGR system 60 in response to the turbine 56 operating in part load. It should be recognized that the EGR system 60 may continue to operate regardless of whether the turbine 56 is operating in part load or full load.

Additionally, the one or more valves 105 may include valves 179 and 181 that separately control the flow of the injection portion 99 of the exhaust gas 61 from the multi-stage compressor 93 to the turbine 56. That is, the valve 179 may be communicatively coupled to the controller 22 and configured to adjust the flow rate of the exhaust gas 61 from the last stage 146 of the multi-stage compressor 93 to the first axial location 165 of the turbine 56. Additionally, or alternatively, the valve 181 may be communicatively coupled to the controller 22 and configured to adjust the flow rate of the exhaust gas 61 from the intermediate stage 144 of the multi-stage compressor 93 to the second axial location 166 of the turbine 56. The controller 22 may be configured to control the valves 179 and 181 synchronously (e.g., together) or, in certain embodiments, separately.

It may be recognized that the exhaust gas injection system 97 may include a combination of the one or more valves 105 in combination with the valves 128 (e.g., 131, 133, and 135). Additionally, in certain embodiments, the one or more valves 105 may include valves disposed at other locations through the exhaust gas injection system 97. In certain embodiments, at least one of the one or more valves 105 may include a redundancy valve and/or a check valve in case of blockage.

In certain embodiments, the controller 22 may be configured to control a combination of the plurality of valves 136 (e.g., 105 and 128) based on one or more operating conditions of the system 10. For example, the controller 22 may be configured to receive a signal indicative of a load of the gas turbine system 12. In certain embodiments, the controller 22 may be configured to receive the signal from a sensor 180 configured to output a signal indicative of the load of the gas turbine system 12. The controller 22 may then determine an estimated load of the gas turbine system 12 based on the signal. For example, the controller 22 may be configured to determine whether the gas turbine system 12 is operating at part load or full load based on the received signal. The controller 22 may be configured to compare the estimated load of the gas turbine system 12 to a threshold load. For example, the threshold load may be a percentage of the full load of the gas turbine system 12. Based on the comparison results, the controller 22 may be configured to control a combination of the plurality of valves 136 (e.g., 105 and 128). For example, the controller 22 may be configured to control the valve 133 to divert the injection portion 99 of the exhaust gas 61 to the multi-stage compressor 93 in response to the estimated load of the gas turbine system 12 exceeding the threshold load.

In certain embodiments, the controller 22 may be configured adjust at least one of the one or more valves 105 to adjust a temperature of the injection portion 99 of the exhaust gas 61. For example, the controller 22 may be configured to receive a signal indicative of a temperature of the injection portion 99 of the exhaust gas 61 from a sensor 182. The controller 22 may then determine an estimated temperature of the injection portion 99 of the exhaust gas 61 based on the signal. The controller 22 may be configured to compare the estimated temperature of the injection portion 99 to a threshold temperature. Based on the comparison results, the controller 22 may be configured to control a combination of the plurality of valves 105. For example, the controller 22 may be configured to control the valve 172 to adjust an amount of engine exhaust gas 152 that is received by the heat exchanger 154, thereby adjusting an amount by which the compressed exhaust gas 156 is heated before being injected into the compressor discharge casing 55. In certain embodiments, controller 22 may be configured to control valve 174 to adjust an amount of engine exhaust gas 152 that is received by the intercooler 101, thereby adjusting an amount by which the compressed exhaust gas 156 is cooled while flowing through the multi-stage compressor 93 and the intercooler 101. In certain embodiments, the controller 22 may be configured to control a combination of the valves 172 and 174 to adjust a temperature of the injection portion 99. Additionally, or alternatively, the controller 22 may be configured to control a combination of the valves 133, 176, and 178 to adjust the amount of exhaust gas 61 that is injected into the compressor discharge casing 55 and the combustors 54.

Figure 3:
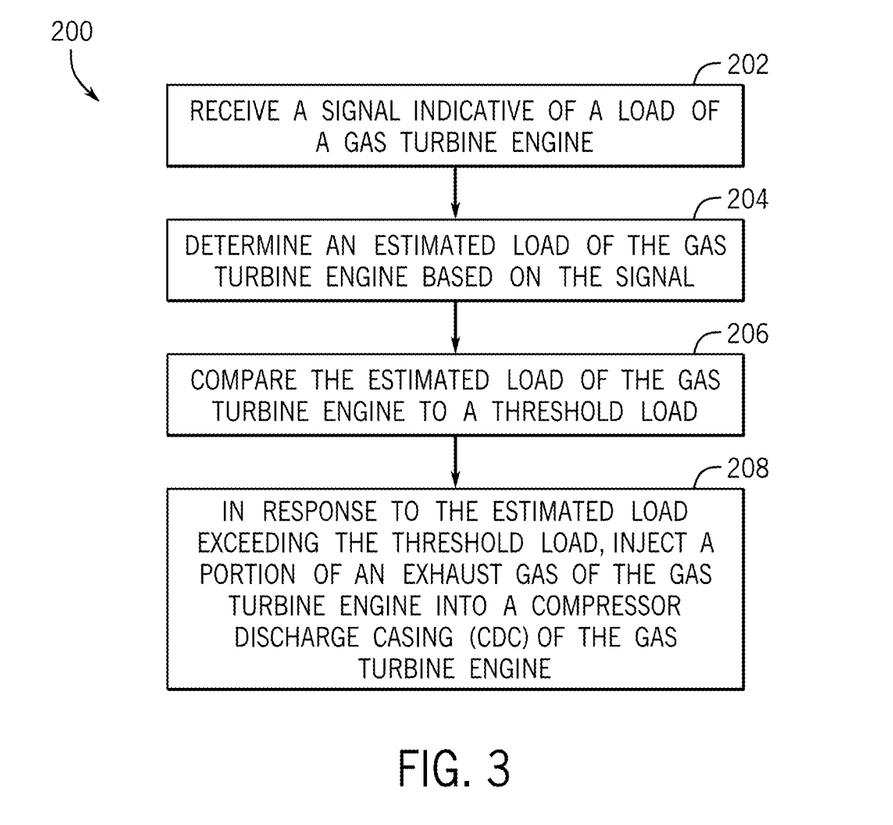
FIG. 3 is a flowchart of an example process for operating the exhaust gas injection system of FIG. 2.

FIG. 3 is a flowchart of an example process 200 for operating the exhaust gas injection system 97 of the EGR system 60. The process 200 may be performed by a computing device or controller disclosed above with reference to FIGS. 1 and 2 or any other suitable computing device(s) or controller(s). Furthermore, the blocks of the process 200 may be performed in the order disclosed herein or in any other suitable order. For example, certain blocks of the process 200 may be performed concurrently. In addition, in certain embodiments, at least one of the blocks of the process 200 may be omitted.

In block 202 of the process 200, a processor (e.g., controller) receives a signal indicative of a load of a gas turbine engine of a gas turbine system 12. For example, the processor may receive a signal from a sensor, the signal indicative of a load of the gas turbine engine. The sensor may include an encoder, a torque sensor, an oxygen sensor, a fuel flowmeter, or a combination thereof.

In block 204 of the process 200, the processor determines an estimated load of the gas turbine engine 12 based on the signal. In certain embodiments, the load of the gas turbine engine 12 may be determined by comparing the flowrate of fuel at a given speed of the gas turbine engine 12 and compare the flowrate with a maximum flowrate of fuel at the same speed and in full throttle. In some embodiments, the processor determines the estimated load based on directly measuring the load using a torque sensor, an encoder, or a combination thereof.

In block 206 of the process 200, the processor compares the estimated load of the gas turbine engine to a first threshold load. In certain embodiments, the first threshold load is less than a full load (e.g., maximum load) of the gas turbine engine 12. For example, the threshold load may be less than 50, 60, 70, 80, or 90 percent of the full load of the gas turbine engine 12.

In block 208 of the process 200, the processor instructs an actuator (e.g., a valve) to divert a portion of an exhaust flow output by an exhaust gas recirculation (EGR) system 60 of the gas turbine engine 12 to a multi-stage compressor 93 based on the comparison results. In certain embodiments, the processer instructs the multi-stage compressor 93 to compress the exhaust flow and/or to inject the exhaust flow into the compressor discharge casing 55 of the gas turbine engine 12. In certain embodiments, the processer instructs the multi-stage compressor 93 to compress the exhaust flow and/or to inject the exhaust flow into the one or more exhaust injection locations 59 downstream of compression by the compressor 52.

Technical effects of the disclosed embodiments include extracting a portion of the exhaust gas from the EGR system 60 of a gas turbine system 12 and injecting the portion of the exhaust gas into one or more exhaust injection locations 59 (e.g., the compressor discharge casing 55, the combustors 54, and/or the turbine 56 of the gas turbine system) to increase efficiency and power output of the gas turbine system 12. By injecting the portion of the exhaust gas of the EGR system 60 into the one or more exhaust injection locations 59, the power output and efficiency of the gas turbine system 12 is increased sufficiently to offset losses in power and efficiency attributed to operation of the gas treatment system 18, particularly the carbon capture system 100. It may be recognized that using a multi-stage centrifugal compressor 93 to compress the exhaust gas prior to injection into the one or more exhaust injection locations 59 may produce compressed exhaust gas 40 percent more efficiently than the axial compressor 52 of the gas turbine system 12. Additionally, it may be recognized that injecting the exhaust gas output by the EGR system 60 into the one or more exhaust injection locations 59 (e.g., compressor discharge casing 55, the combustors 54, and/or the turbine 56) increases the power output (e.g., capacity) of the gas turbine system by up to 10 percent, regardless of ambient conditions. Again, an important advantage of the disclosed embodiments includes recovering a portion of the efficiency and power lost due to the carbon capture system 100, such that the system 10 has a relatively low, zero, or negative carbon footprint without a substantial reduction in efficiently and power output by the system 10.

The subject matter described in detail above may be defined by one or more clauses, as set forth below.

A system includes: a gas turbine system having a gas turbine engine including a compressor, a combustor, and a turbine; and an exhaust gas recirculation (EGR) system configured to recirculate a first portion of an exhaust flow from the gas turbine engine to an intake of the gas turbine engine; and an exhaust gas injection system, including a multi-stage compressor including a plurality of stages, wherein the multi-stage compressor is configured to compress a second portion of the exhaust flow; and an intercooler coupled to the multi-stage compressor; wherein the exhaust gas injection system is configured to inject the second portion of the exhaust flow into the gas turbine engine at one or more exhaust injection locations to provide power augmentation of the gas turbine engine, the one or more exhaust injection locations being axially spaced from the intake of the gas turbine engine.

The system of the preceding clause, including a controller having a memory, a processor, and instructions stored on the memory and executable by the processor to control the exhaust gas injection system to adjust the power augmentation based on a load of the gas turbine engine, a power demand by a carbon capture system, or a combination thereof.

The system of any preceding clause, including a carbon capture system configured to capture carbon from the exhaust flow from the gas turbine engine, wherein the power augmentation is configured to compensate for losses in power and/or efficiency caused by operation of the carbon capture system.

The system of any preceding clause, wherein the carbon capture system includes a sorbent-based carbon capture system, a solvent-based carbon capture system, a cryogenic carbon capture system, or a combination thereof, wherein the carbon capture system is configured to capture at least carbon dioxide ($CO_2$) from the exhaust flow.

The system of any preceding clause, including a controller having a memory, a processor, and instructions stored on the memory and executable by the processor to control the exhaust gas injection system to adjust the power augmentation based on the operation of the carbon capture system.

The system of any preceding clause, wherein the controller is configured to control the exhaust gas injection system to adjust the second portion of the exhaust flow to the one or more exhaust injection locations, wherein the one or more exhaust injection locations include a last stage of the compressor, a compressor discharge casing of the compressor, the combustor, the turbine, or a combination thereof.

The system of any preceding clause, wherein the one or more exhaust injection locations include a last stage of the compressor.

The system of any preceding clause, wherein the one or more exhaust injection locations include a compressor discharge casing of the compressor.

The system of any preceding clause, wherein the one or more exhaust injection locations include the turbine.

The system of any preceding clause, wherein the one or more exhaust injection locations include a plurality of turbine injection locations into the turbine of the gas turbine engine, wherein the plurality of stages of the multi-stage compressor are coupled to the plurality of turbine injection locations.

The system of any preceding clause, wherein the exhaust gas injection system includes an engine configured to drive the multi-stage compressor, wherein the engine produces an engine exhaust gas, and a heat exchanger is configured to transfer heat from the engine exhaust gas to the second portion of the exhaust flow compressed by the multi-stage compressor.

The system of any preceding clause, wherein the engine includes a reciprocating piston-cylinder engine having a turbocharger driven by at least part of the engine exhaust gas.

The system of any preceding clause, wherein the gas turbine system includes a heat recovery steam generator (HRSG) configured to receive at least part of the engine exhaust gas from the engine and at least part of the exhaust flow from the gas turbine engine.

The system of any preceding clause, wherein the exhaust gas injection system includes a plurality of valves. The plurality of valves includes a first valve disposed between the heat exchanger and the engine, a second valve disposed between the heat exchanger and the intercooler, a third valve disposed between the heat exchanger and a compressor discharge casing of the compressor of the gas turbine engine, a fourth valve disposed between the EGR system and the multi-stage compressor, or a combination thereof.

The system of any preceding clause, including a controller having a memory, a processor, and instructions stored on the memory and executable by the processor to receive a signal indicative of a load of the gas turbine engine, determine an estimated load of the gas turbine engine based on the signal, compare the estimated load of the gas turbine engine to a threshold load, and in response to the estimated load exceeding the threshold load, control the fourth valve to divert the second portion of the exhaust flow to the multi-stage compressor.

A system includes a controller having a memory, a processor, and instructions stored on the memory and executable by the processor to control a first portion of an exhaust flow from a gas turbine engine through an exhaust gas recirculation (EGR) system to an intake of the gas turbine engine, wherein the gas turbine engine includes a compressor, a combustor, and a turbine. The controller is further configured to control a second portion of the exhaust flow from the gas turbine engine through an exhaust gas injection system to one or more exhaust injection locations to provide power augmentation of the gas turbine engine, the one or more exhaust injection locations being axially spaced from the intake of the gas turbine engine.

The system of the preceding clause, wherein the controller is configured to adjust the power augmentation based on a load of the gas turbine engine, a power demand by a carbon capture system, or a combination thereof.

The system of any preceding clause, wherein the exhaust gas injection system includes a multi-stage compressor having a plurality of stages, and an intercooler coupled to the multi-stage compressor.

A method including controlling a first portion of an exhaust flow from a gas turbine engine through an exhaust gas recirculation (EGR) system to an intake of the gas turbine engine, wherein the gas turbine engine includes a compressor, a combustor, and a turbine. The method further includes controlling a second portion of the exhaust flow from the gas turbine engine through an exhaust gas injection system to one or more exhaust injection locations to provide power augmentation of the gas turbine engine, the one or more exhaust injection locations being axially spaced from the intake of the gas turbine engine.

The method of the preceding clause, wherein controlling the second portion of the exhaust flow includes adjusting the power augmentation based on a load of the gas turbine engine, a power demand by a carbon capture system, or a combination thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a gas turbine system comprising:
      a gas turbine engine comprising a compressor, a combustor, and a turbine; and
      an exhaust gas recirculation (EGR) system configured to recirculate a first portion of an exhaust flow from the gas turbine engine to an intake of the gas turbine engine;
   an exhaust gas injection system, comprising:
      a multi-stage compressor comprising a plurality of stages, wherein the multi-stage compressor is configured to compress a second portion of the exhaust flow;
      an intercooler coupled to the multi-stage compressor; and
      a heat exchanger configured to transfer heat from a combustion exhaust gas output by a combustion system to the second portion of the exhaust flow compressed by the multi-stage compressor, wherein the combustion system is different from the combustor of the gas turbine system;
   wherein the exhaust gas injection system is configured to inject the second portion of the exhaust flow into the gas turbine engine at one or more exhaust injection locations to provide power augmentation of the gas turbine engine, the one or more exhaust injection locations being axially spaced from the intake of the gas turbine engine.

2. The system of claim 1, comprising a controller having a memory, a processor, and instructions stored on the memory and executable by the processor to control the exhaust gas injection system to adjust the power augmentation based on a load of the gas turbine engine, a power demand by a carbon capture system, or a combination thereof.

3. The system of claim 1, comprising a carbon capture system configured to capture carbon from the exhaust flow from the gas turbine engine, wherein the power augmentation is configured to compensate for losses in power and/or efficiency caused by operation of the carbon capture system.

4. The system of claim 3, wherein the carbon capture system comprises a sorbent-based carbon capture system, a solvent-based carbon capture system, a cryogenic carbon capture system, or a combination thereof, wherein the carbon capture system is configured to capture at least carbon dioxide ($CO_2$) from the exhaust flow.

5. The system of claim 3, comprising a controller having a memory, a processor, and instructions stored on the memory and executable by the processor to control the exhaust gas injection system to adjust the power augmentation based on the operation of the carbon capture system.

6. The system of claim 5, wherein the controller is configured to control the exhaust gas injection system to adjust the second portion of the exhaust flow to the one or more exhaust injection locations, wherein the one or more exhaust injection locations comprise a last stage of the compressor, a compressor discharge casing of the compressor, the combustor, the turbine, or a combination thereof.

7. The system of claim 1, wherein the one or more exhaust injection locations comprise a last stage of the compressor.

8. The system of claim 1, wherein the one or more exhaust injection locations comprise a compressor discharge casing of the compressor.

9. The system of claim 1, wherein the one or more exhaust injection locations comprise the turbine.

10. The system of claim 9, wherein the one or more exhaust injection locations comprise a plurality of turbine injection locations into the turbine of the gas turbine engine, wherein the plurality of stages of the multi-stage compressor are coupled to the plurality of turbine injection locations.

11. The system of claim 1, wherein the combustion system comprises an engine configured to drive the multi-stage compressor, wherein the engine produces the combustion exhaust gas.

12. The system of claim 11, wherein the engine comprises a reciprocating piston-cylinder engine having a turbocharger driven by at least part of the combustion exhaust gas.

13. The system of claim 11, wherein the gas turbine system comprises a heat recovery steam generator (HRSG) configured to receive at least part of the combustion exhaust gas from the engine and at least part of the exhaust flow from the gas turbine engine.

14. The system of claim 11, wherein the exhaust gas injection system comprises a plurality of valves, wherein the plurality of valves comprises:
    a first valve disposed between the heat exchanger and the engine;
    a second valve disposed between the heat exchanger and the intercooler;
    a third valve disposed between the heat exchanger and a compressor discharge casing of the compressor of the gas turbine engine;
    a fourth valve disposed between the EGR system and the multi-stage compressor; or
    a combination thereof.

15. The system of claim 14, comprising a controller having a memory, a processor, and instructions stored on the memory and executable by the processor to:
    receive a signal indicative of a load of the gas turbine engine;
    determine an estimated load of the gas turbine engine based on the signal;
    compare the estimated load of the gas turbine engine to a threshold load; and
    in response to the estimated load exceeding the threshold load, control the fourth valve to divert the second portion of the exhaust flow to the multi-stage compressor.

16. A system, comprising:
    a controller having a memory, a processor, and instructions stored on the memory and executable by the processor to control:
    a first portion of an exhaust flow from a gas turbine engine through an exhaust gas recirculation (EGR) system to an intake of the gas turbine engine, wherein the gas turbine engine comprises a compressor, a combustor, and a turbine; and
    a second portion of the exhaust flow from the gas turbine engine through an exhaust gas injection system to one or more exhaust injection locations to provide power augmentation of the gas turbine engine, the one or more exhaust injection locations being axially spaced from the intake of the gas turbine engine;
    wherein the controller is configured to adjust the power augmentation based on an operation of a carbon capture system.

17. The system of claim 16, wherein the controller is configured to adjust the power augmentation to compensate for losses in power and/or efficiency caused by the operation of the carbon capture system.

18. The system of claim 16, comprising a heat exchanger configured to transfer heat from a combustion exhaust gas output by a combustion system to the second portion of the exhaust flow, wherein the combustion system is different from the combustor of the gas turbine engine.

19. A method, comprising:
    controlling a first portion of an exhaust flow from a gas turbine engine through an exhaust gas recirculation (EGR) system to an intake of the gas turbine engine, wherein the gas turbine engine comprises a compressor, a combustor, and a turbine;
    controlling a second portion of the exhaust flow from the gas turbine engine through an exhaust gas injection system to one or more exhaust injection locations to provide power augmentation of the gas turbine engine, the one or more exhaust injection locations being axially spaced from the intake of the gas turbine engine; and
    adjusting the power augmentation based on an operation of a carbon capture system.

20. The method of claim 19, comprising transferring heat, via a heat exchanger, from a combustion exhaust gas output by a combustion system to the second portion of the exhaust flow, wherein the combustion system is different from the combustor of the gas turbine engine.

* * * * *